Patented Jan. 26, 1932

1,842,535

UNITED STATES PATENT OFFICE

JOHANNES BRODE AND CARL WURSTER, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

PRODUCTION OF HYDRATED CHROMIC CHLORIDE

No Drawing. Original application filed July 30, 1926, Serial No. 126,085, and in Germany March 11, 1926. Divided and this application filed December 19, 1928. Serial No. 327,168.

The present invention relates to the production of hydrated chromic chloride from anhydrous salt.

The present application is divided out from our co-pending application for the manufacture of chromium chloride Ser. No. 126,085, filed July 30, 1926.

We have found that anhydrous chromic chloride can be easily dissolved in water by exposing its aqueous suspension to the action of a cathodically polarized conductor. For example, a cathode of a metal, such as lead is employed with an anode of graphite. In order to avoid contamination of the solution by oxidation products formed at the anode, the anode may be surrounded by a diaphragm; it is, however, more suitable to make the anode of chromium, whereby a diaphragm may be dispensed with.

The process is preferably carried out in a lead vessel employed as cathode. The current density required for causing dissolution of the anhydrous salt is very small; for example less than 0.02 ampere per square decimeter of the electrode surface is sufficient. Even large quantities of chromic chloride can thus be dissolved in a few minutes. By reason of the cathodic polarization of the lead vessel, the chromic chloride is not contaminated by dissolved lead.

As the dissolution of anhydrous chromic chloride is an exothermic reaction, the temperature of the solution rises to boiling, so that highly concentrated chromic chloride solutions can be obtained at once and these on cooling solidify entirely or partly to hydrated chromic chloride.

The process is of particular advantage for the purification of chromic chloride containing carbon as obtained, for instance, by treating ferro-chromium with chlorine. In this case the hot chromic chloride solutions obtained in the manner described above are filtered, before being allowed to solidify.

What we claim is:—
1. A process for the production of hydrated chromic chloride, which comprises exposing an aqueous suspension of anhydrous chromic chloride to the action of the polarized cathode.
2. A process for the production of hydrated chromic chloride which comprises exposing an aqueous suspension of anhydrous chromic chloride to the action of a polarized cathode and filtering the solutions while hot.
3. A process for the production of high grade chromic chloride which comprises exposing an aqueous suspension of anhydrous chromic chloride to the action of a polarized cathode at a current density of about .02 ampere per square decimeter.

In testimony whereof, we affix our signatures.

JOHANNES BRODE.
CARL WURSTER.